(12) United States Patent
Bargheer et al.

(10) Patent No.: US 6,786,545 B2
(45) Date of Patent: Sep. 7, 2004

(54) WIND PROTECTION DEVICE FOR AN OPEN MOTOR VEHICLE

(75) Inventors: Claudio Bargheer, Stuttgart (DE); Peter Nordberg, Graz (AT); Vasilios Orizaris, Renningen (DE); Karl Pfahler, Stuttgart (DE); Lothar Renner, Nufringen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/985,171

(22) Filed: Nov. 1, 2001

(65) Prior Publication Data

US 2002/0057005 A1 May 16, 2002

(30) Foreign Application Priority Data

Nov. 1, 2000 (JP) .......................................... 100 54 009

(51) Int. Cl.⁷ .............................. A47C 31/00; A47C 7/74
(52) U.S. Cl. ................................ 297/217.1; 297/217.2; 297/217.3; 454/120
(58) Field of Search .......................... 297/217.1, 217.2, 297/217.3, 180.13; 454/120; 296/65.01, 208

(56) References Cited

U.S. PATENT DOCUMENTS

| | | | | |
|---|---|---|---|---|
| 2,791,956 A | * | 5/1957 | Guest ........................ | 454/120 |
| 3,101,660 A | * | 8/1963 | Taylor ....................... | 454/120 |
| 4,685,727 A | | 8/1987 | Cremer et al. | |
| 5,137,326 A | * | 8/1992 | George ...................... | 296/208 |
| 5,524,439 A | * | 6/1996 | Gallup et al. .............. | 62/3.5 |
| 5,924,766 A | * | 7/1999 | Esaki et al. ............ | 303/122.05 |
| 5,934,748 A | | 8/1999 | Faust et al. | |
| 6,213,865 B1 | * | 4/2001 | Odebrecht ................. | 454/151 |
| 6,261,173 B1 | * | 7/2001 | Odebrecht ................. | 454/151 |
| 6,321,996 B1 | * | 11/2001 | Odebrecht et al. ...... | 237/12.3 A |
| 6,341,814 B1 | * | 1/2002 | Honninger et al. ....... | 296/208 |
| 6,439,658 B1 | * | 8/2002 | Ganz et al. ............... | 297/180.14 |

FOREIGN PATENT DOCUMENTS

| | | |
|---|---|---|
| DE | 9201474 | 5/1992 |
| DE | 9201474.7 | 5/1992 |
| DE | 19703516 | 8/1999 |
| DE | 19910390 | 9/1999 |
| DE | 19830274 | 1/2000 |
| WO | 95/14899 | 6/1995 |

* cited by examiner

*Primary Examiner*—Peter M. Cuomo
*Assistant Examiner*—Sarah C. Burnham
(74) *Attorney, Agent, or Firm*—Crowell & Moring LLP

(57) ABSTRACT

A wind protection device for an open motor vehicle includes a passenger cell that has at least one car seat with a backrest. There is on a level with the top area of the backrest at least one air outflow opening of an air supply system. Thereby, the head, shoulder and neck area of the seat occupant is impinged on with an air stream that can be regulated to avoid an undesired air draft. The air supply system has at least one sensor to measure a parameter value, whereby the air stream, issuing from the air outflow opening, is regulated as a function of the parameter value by way of a regulating unit.

4 Claims, 2 Drawing Sheets

WIND PROTECTION DEVICE FOR AN OPEN MOTOR VEHICLE

BACKGROUND AND SUMMARY OF THE INVENTION

This application claims the priority of German Patent Document 100 54.009.0, filed Nov. 1, 2000, the disclosure of which is expressly incorporated by reference herein.

The present invention relates to a wind protection device for an open motor vehicle having a passenger cell (10) that has at least one car seat (12) with a backrest (16), wherein, on a level with the top area of the backrest (16) at least one air outflow opening (18) of an air supply system (14) is provided, by way of which a head, shoulder and neck area of a seat occupant is impinged on with a regulatable air stream to avoid undesired air draft.

DE 92 01 474 U1 discloses a wind protection device for an open motor vehicle, in whose passenger cell there are two car seats arranged in a row. At a distance behind the seats there is a tube, which is on a level with the top area of the backrest, runs in the transverse direction of the vehicle and exhibits air outflow openings. Thereby, the head, shoulder and neck area of the seat occupant can be impinged on with an air stream that can be regulated to avoid an undesired air draft.

SUMMARY OF THE INVENTION

An object of the present invention is to provide a wind protection device of the aforementioned type with improved comfort for the seat occupants when driving with the top down.

The present invention achieves this object with a wind protection device in which and wherein the air supply system (14) comprises at least one sensor (20, 22) to measure a parameter value, whereby system is configured such that the air stream, issuing from the at least one air outflow opening (18), is regulatable as a function of a parameter value by a regulating unit (24).

According to the invention, the air supply system exhibits at least one sensor to measure a parameter value and one regulating device, which assumes the control of the air stream, flowing out of the air outflow opening, as a function of the measured parameter value. In particular, the sensors can be used to measure the driving speed, the outside temperature or the humidity.

At the same time, to increase the comfort of the passengers, the wind protection device of the present invention accounts for the fact that, for example, at a higher driving speed the turbulence is stronger in the head and neck area of the passenger. Correspondingly, as the driving speed increases, the head and neck area of the passenger is provided with a stronger air stream, which is controlled by the regulating device, in order to compensate for this swirling. The wind protection device of the present invention is also capable of equalizing the fluctuations in the outside temperature, thus providing the seat occupant with a constant pleasant feeling in the head and neck area by way of an adaptive control of the air stream.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWRINGS

Figure 1:
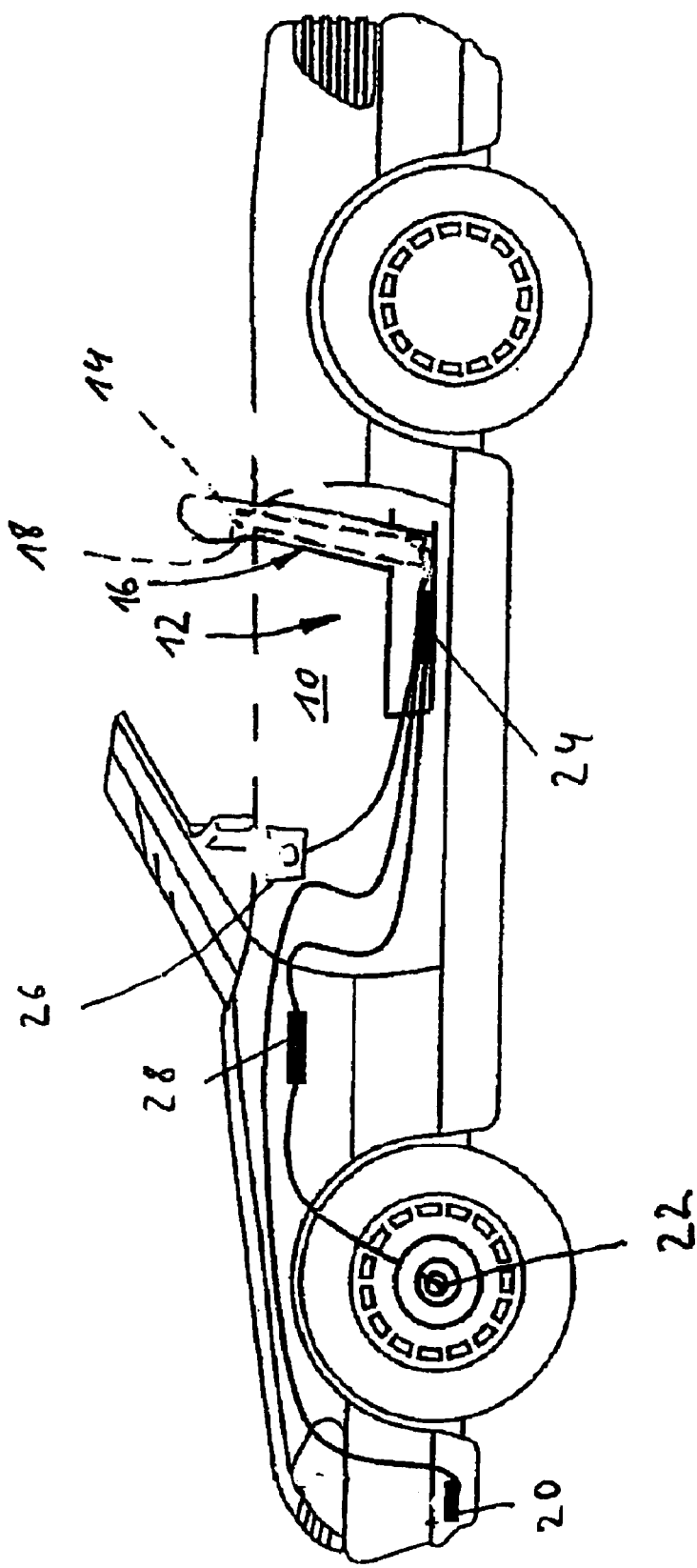
FIG. 1 is a schematic side view of an open motor vehicle, in whose passenger cell is provided A wind protection device, according to the present invention which is assigned to the respective car seat.
Figure 2:
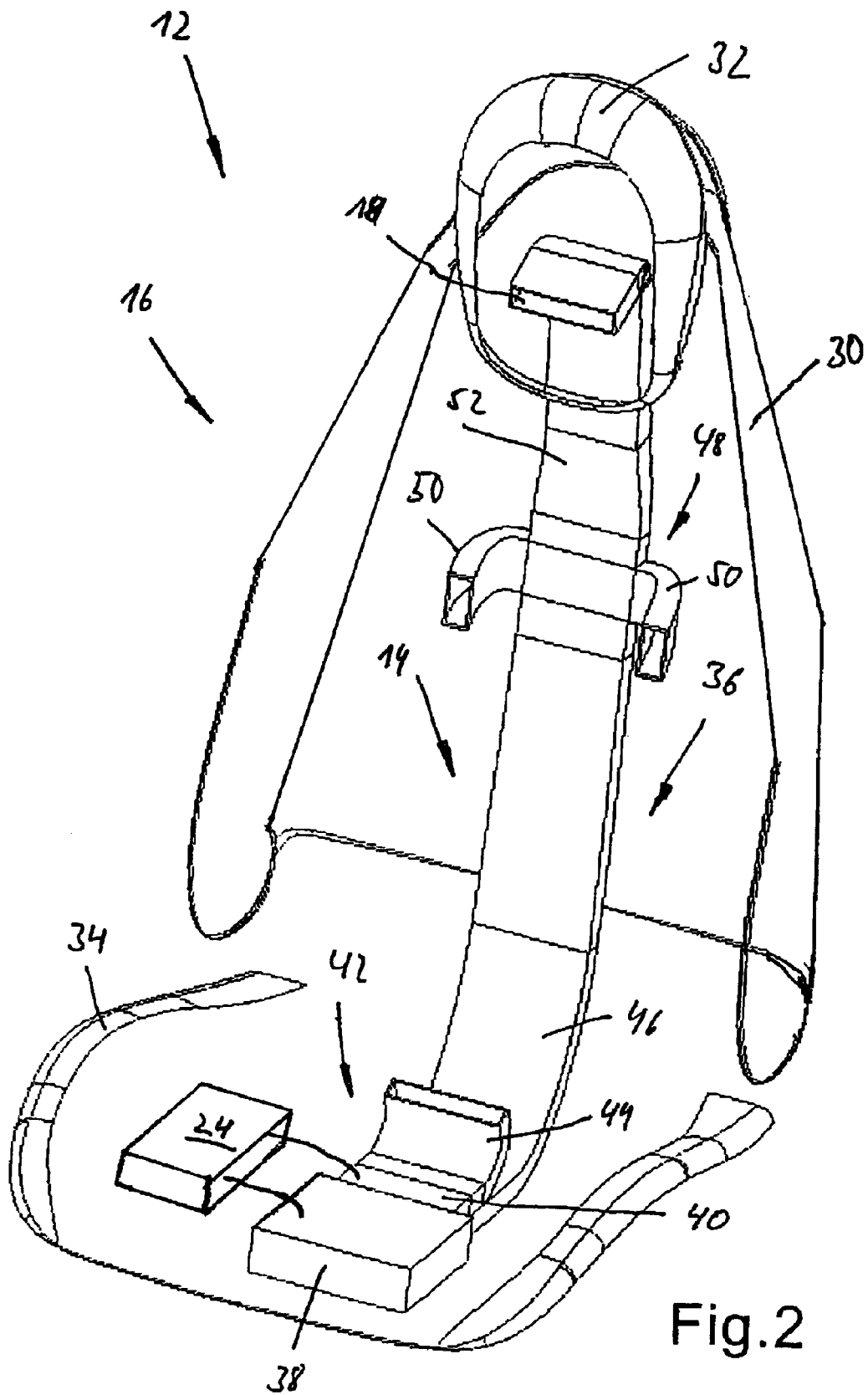
FIG. 2 is a perspective view of the wind protection device of FIG. 1 which is assigned to the car seat and exhibits an air supply system, which is integrated into the backrest and with which the air stream is produced for the seat occupant to avoid the undesired features of an air draft.

FIG. 1 is a schematic side view of an open motor vehicle, in whose passenger cell 10 there is a row of seats with two car seats 12. An air supply system 14, which is depicted only schematically in FIG. 1 and which is explained in greater detail below with reference to FIG. 2, is integrated into the two car seats 12. An air outflow opening 18 of the air supply system 14 can be recognized on a level with the top area of the backrest 16 of the seat 12. For the purpose of avoiding an undesired air draft, the head, shoulder and neck area of the seat occupant can be supplied with a controllable air stream with this air outflow opening 18 in a manner that is explained in greater detail below.

The air supply system 14 is connected here both to a sensor 20 to measure the outside temperature and to a sensor 22 to measure the driving speed. The two sensors 20, 22 are connected to a regulating device 24, which is disposed within the respective seat 12 and thereby the air stream, issuing from the air outflow opening 18, is controlled as a function of the said parameter values of the outside temperature and/or the driving speed. In addition, the interior of the motor vehicle exhibits another regulating device 26, so that the air stream can be set by the seat occupant. In the embodiment illustrated, the driving speed is measured by an ABS control unit 28, which is present in any event and which transforms the momentary driving speed into an electronic signal and sends it to the regulating device 26. The outside temperature can be measured by a temperature sensor 20 which is present in any event to display the temperature in the cockpit. In this respect the temperature is transformed into an electronic signal and sent to the regulating device 26 in the seat 12.

FIG. 2 is a schematic perspective view of one of the two car seats 12, according to FIG. 1, with the air supply system to avoid the undesired phenomena of an air draft for the seat occupant. The backrest 16 of the seat 12 is comprised of a frame 30 and a vertically adjustable head support 32. Of the seat cushion element of the seat 12 only a bottom frame 34 is depicted. The air supply system 14, which comprises a duct arrangement 36, is integrated into the backrest 16 and the seat cushion element 34. The duct arrangement 36 is connected upstream of a blower 38, which is received by a housing and whose air suction takes place on the bottom side of the seat cushion element 34. On the pressure side of the blower 38, the air stream flows to a heating element 40, which can be switched on and with which the temperature of the air stream can be regulated.

Downstream of the heating element 40 is a distributing unit 42, with which the air stream, depending on the setting, can be distributed to a bottom sectional duct 44 and/or an upper sectional duct 46. The bottom sectional duct 44 serves to supply the air outflow openings (not illustrated) in the seat cover of the seat cushion element 34. The openings are provided for the purpose of heating or ventilating the seat.

At approximately half the height of the backrest 16 there is another distributing unit 48, with which air, flowing through the sectional duct 46, is diverted to two sectional ducts 50 for the purpose of supplying the air outflow openings in the non-illustrated seat cover of the backrest 16, or can be distributed over a supply duct 52 to supply air to an air outflow mechanism 54 in the head support 32. The air outflow openings (not illustrated) in the seat cover of the backrest 16 serve to heat the seat or ventilate the seat of the same.

The air outflow mechanism 54 with the air outflow opening 18, described with respect to FIG. 1, in the head support 32 serves to prevent the phenomena of an air draft in the head, shoulder and neck area of the seat occupant. This air draft is produced when driving with the top folded down. The air outflow mechanism 54 ends approximately flush with the surface and is integrated into the head support 32 on its front side. The air outflow mechanism 42 is fastened with its front top end to the head support 32 and is coupled with the support so as to be moveable so that after adjustment of the head support 32 the air outflow opening 18 is also located optimally with respect to the head of the occupant. The air stream, issuing from the opening, is focused optimally on the head and neck area of the passenger.

It is evident that the blower 38 and the heating element 40 for producing the thermostated air stream, issuing from the air outflow opening 18, can be controlled by the regulating unit 24. As a function of the signals of the two sensors 20 and 22, the blower 38 and/or the heating element 40 is/are controlled in accordance with the driving speed or the outside temperature. Since, for example, as the driving speed increases, the turbulence in the head and neck area of the passenger becomes stronger, the blower 38 conveys more air to the air outflow opening 18 as the driving speed increases. As more air is demanded, the calorific output of the heating element 40 is also increased by the regulating unit 24. Similarly the calorific output of the heating element 40 is raised by the regulating unit 24 as the outside temperature drops. In addition, it is possible for the seat occupant to set an appropriate temperature and intensity of the air stream, issuing from the air outflow opening 18 with the other regulating unit 26.

The above-described air supply system 14 serves to supply both the seat surface facing the occupant and the air outflow opening 18 with air. Similarly an air supply system 14 that is provided only to supply the air outflow opening 18 is contemplated.

The air supply system 14, integrated here into the motor vehicle seat 12, can also be arranged outside the seat, for example, on the rearside of the backrest 16. Similarly an air supply system 14 can also be used that is arranged on the body side, for example, in the rear separating wall.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Wind protection device for an open motor vehicle, having a passenger cell that has at least one car seat with a backrest, comprising an air supply system having at least one air outflow opening on a level with a top area of the backrest so that a head, shoulder and neck area of a seat occupant is impinged on with a regulatable air stream to avoid undesired air draft, at least one sensor is provided to measure a parameter value, which is used to regulate the regulatable air stream issuing from the at least one air outflow opening, via a reagulating unit, as a function of the measured parameter value, wherein the system is configured such that the regulatable air stream is regulatable as a function of motor vehicle driving speed.

2. Wind protection device according to claim 1, wherein an existing ABS control unit in the open motor vehicle measures the driving speed.

3. Wind protection device according to claim 1, wherein the measured parameter value is used for an adaptive control of the regulatable air stream.

4. Wind protection device according to claim 3, wherein the regulatable air stream is adapted according to the measured parameter value in order to compensate swirling air in the head and neck area of the passenger.

* * * * *